United States Patent
Ruppert et al.

(10) Patent No.: US 11,618,638 B2
(45) Date of Patent: Apr. 4, 2023

(54) PRODUCT LEVELING DEVICE WITHIN A TANK

(71) Applicant: CNH Industrial Canada, Ltd., Saskatoon (CA)

(72) Inventors: Rex Ruppert, Benson, MN (US); Martin Roberge, Saskatoon (CA); Joel Denis, Saskatoon (CA)

(73) Assignee: CNH INDUSTRIAL CANADA, LTD., Saskatoon (CA)

( * ) Notice: Subject to any disclaimer, the term of this patent is extended or adjusted under 35 U.S.C. 154(b) by 557 days.

(21) Appl. No.: 16/736,341

(22) Filed: Jan. 7, 2020

(65) Prior Publication Data

US 2021/0206589 A1 Jul. 8, 2021

(51) Int. Cl.
*A01C 15/00* (2006.01)
*B65G 65/48* (2006.01)
*B65G 69/08* (2006.01)

(52) U.S. Cl.
CPC ........ *B65G 65/4809* (2013.01); *A01C 15/007* (2013.01); *B65G 69/08* (2013.01); *B65G 2201/0202* (2013.01); *B65G 2814/0223* (2013.01); *B65G 2814/0319* (2013.01)

(58) Field of Classification Search
CPC .................................................. A01C 15/007
See application file for complete search history.

(56) References Cited

U.S. PATENT DOCUMENTS

| | | | | |
|---|---|---|---|---|
| 2,814,421 A | * | 11/1957 | Buhr ...................... | A01C 15/16 222/485 |
| 2,998,152 A | * | 8/1961 | Teibel .................. | A01C 15/003 198/662 |
| 3,155,247 A | | 11/1964 | Patterson | |
| 3,438,517 A | | 4/1969 | Steffen | |

(Continued)

FOREIGN PATENT DOCUMENTS

| | | |
|---|---|---|
| CA | 2400843 | 10/2005 |
| CN | 102964157 | 3/2013 |

(Continued)

OTHER PUBLICATIONS

Mixmachinery; "What is Horizontal Dry Ingredient Feed Mixer Design?"; web article; Apr. 18, 2017; 3 pages; www.medium.com.

*Primary Examiner* — Mark C Hageman (74) *Attorney, Agent, or Firm* — Rebecca Henkel; Rickard DeMille (57) ABSTRACT

The invention provides a product leveling system within at least one tank or particulate material supply compartment that helps to encourage uniform movement of an agricultural product out of the bottom of the compartment. More specifically, the invention relates to a product leveling system that helps monitor areas in which agricultural product is prone to starving and also prone to accumulation, such that quantities of the agricultural product can be diverted from the areas prone to accumulation to the areas prone to starving. For instance, at least one leveling device having a driving shaft and a helical coil may be rotatably mounted (Continued)

within the compartment and rotated to encourage agricultural product to be moved from areas of accumulation to areas where the agricultural product is more quickly removed, resulting in starving. The product leveling system may include three coils mounted about the compartment.

13 Claims, 9 Drawing Sheets

(56) References Cited

U.S. PATENT DOCUMENTS

| | | | |
|---|---|---|---|
| 3,946,997 A | | 3/1976 | Grenzebach |
| 4,138,463 A | | 2/1979 | Moneghan |
| 5,333,762 A | | 8/1994 | Andrews |
| 5,944,233 A | * | 8/1999 | Bourne ............... G01F 13/001 222/274 |
| 6,854,405 B2 | * | 2/2005 | Memory ............ A01C 15/006 111/173 |
| 7,055,536 B2 | * | 6/2006 | Smiley ............... A01K 5/0225 119/51.01 |
| 7,392,895 B2 | | 7/2008 | Ottow et al. |
| 10,051,779 B2 | * | 8/2018 | Chahley ............... A01C 7/081 |
| 2015/0118376 A1 | * | 4/2015 | Huyzer ............... B01F 27/172 241/101.76 |
| 2021/0127566 A1 | * | 5/2021 | Harmon ............... A01C 15/007 |

FOREIGN PATENT DOCUMENTS

| | | |
|---|---|---|
| CN | 203072340 | 7/2013 |
| JP | 5985832 | 9/2016 |

\* cited by examiner

PRODUCT LEVELING DEVICE WITHIN A TANK

FIELD OF THE INVENTION

The present invention relates generally to agricultural equipment, and, more particularly, to an agricultural product delivery system having a product leveling system mounted within a tank to minimize blockage-type accumulation of product within the tank. The present invention may include at least one helical coil located adjacent to the bottom of the tank that rotates to move product from zones prone to accumulation during the emptying of the tank to zones prone to product depletion or starving.

BACKGROUND OF THE INVENTION

Agricultural product delivery systems are known to utilize various mechanisms, including mechanical and pneumatic systems, i.e., a flow of air, to assist in the delivery and movement of particulate material or product such as fertilizer, seed, insecticide or herbicide from a product supply chamber or tank to a product applicator that places the product on or in growing medium, such as soil. Such agricultural product delivery systems are commonly employed in planters, air drills, fertilizer and pesticide applicators and a variety of other agricultural implements.

Agricultural implements that employ an agricultural product delivery system are known to have a particulate material supply source such as one or more tanks that are loaded with the particulate material or materials to be applied. The tanks have or are associated with a metering device, which typically consists of a rotating element, which meters the particulate materials from the tanks into a set of distribution channels, such as conduits, hoses, etc., for application to the farm field. In most systems, a pneumatic source such as a fan or blower provides air to convey and distribute material through the distribution channels.

Systems as described have provided certain advantages and have worked acceptably in some aspects, but are not without disadvantages, inefficiencies or inconveniences. For example, depending on the shape of the tank, portions of the product may accumulate along the bottom or sides of the tank during emptying of the product. For instance, new tank designs oftentimes include a multitude of metering devices, which in turn creates a large, flat bottom in the particulate material supply compartment or tank, which can result in the accumulation of product in some areas, whereas product is more quickly removed from other areas. This may result in the formation of bridges across the tank, that prevent the material from being distributed. Similarly, product may be removed from certain sections of the tank at a more rapid rate than others. This can result in starving of materials at certain portions of the tank, whereas excess product is still available in other portions of the tank. As a result, certain metering sections may be deprived the agricultural product when there is still a significant quantity of product within the compartment or tank. Such problems can be exacerbated when the agricultural machine is operated on a sloped surface, resulting in further accumulation of products at sections of the tank closest to the bottom of the slope.

In order to alleviate the problems associated with the agglomeration of the material within the tank, many types of mechanical agitators have been developed. These agitators are positioned within the tank and can be operated to agitate the material and break up any agglomeration or bridges of the material that have formed within the tank. However, as the placement of the mechanical agitators within the tank limits their ability to agitate material that is not immediately adjacent the agitator, in certain situations all agglomerations and bridges cannot be broken up effectively, or to distribute material that has an uneven horizontal profile due to previous sectional control.

What is needed is an agricultural machine including product leveling systems that are located within the tank to move product from zones of accumulation within the tank. What is further needed is product leveling systems for the tanks of the application that addresses these issues to improve efficiency and convenience of the applicator without further complicating its construction

SUMMARY OF THE INVENTION

The invention provides a product leveling system for an agricultural product delivery system that distributes agricultural product about at least one particulate material supply compartment. In accordance with one aspect, the product leveling system includes at least one helical leveling device. The particulate material supply compartment includes a first side, a second side, and a bottom, where the at least one helical leveling device that is rotatably mounted at the bottom. The at least one leveling device is located above a plurality of metering units that are mounted adjacent to the bottom of the compartment. The at least one leveling device may be rotated to enable uniform or semi-uniform movement of the agricultural product out of the bottom of the at least one particulate material supply compartment and into the plurality of metering units. For instance, the at least one leveling device may be rotated to distribute a quantity of the agricultural product about the at least one particulate material supply compartment. More specifically, the at least one leveling device may be rotated to move the agricultural product from an area of accumulation within the compartment to an area prone to emptying or starving.

In accordance with another aspect, the product leveling system additionally has at least one sensor mounted about the metering array in the at least one particulate material supply compartment. For instance, the at least one sensor may be mounted adjacent to an area prone to emptying or starving. As such, the sensor can identify when product has been removed from a given section of the at least one particulate material supply compartment. The at least one sensor may be mounted to the bottom of the compartment or it may be mounted to the plurality of metering units. In the event that the sensor does determine that agricultural product has been emptied from a given section of the compartment, the at least one leveling device may be rotated.

In accordance to yet another aspect, the at least one leveling device of the product leveling system may include a first leveling device mounted adjacent to the first side of the at least one particulate material supply compartment, and a second leveling device mounted adjacent to the second side of the at least one particulate material supply compartment. The first leveling device may include a driving shaft and a right-handed helical coil extending therefrom. The second leveling device may include a driving shaft and a left-handed helical coil extending therefrom. Additionally, the first leveling device may be rotated in a first direction, and the second leveling device may also be rotated in the first direction. Alternatively, the first leveling device may be rotated in the first direction and the second leveling device may be rotated in a second direction opposite the first direction. Further still, the at least one leveling device may include a third leveling device that is located between the first leveling device and the second leveling device. Each of the leveling devices may be one of a helical coil having a flat bar, a helical coil having a square bar, and a helical coil having a round bar.

In accordance with yet another aspect, a method of using an agricultural product delivery system having a product leveling system is provided. The method may include the steps of loading an agricultural product into a particulate material supply compartment having a bottom, rotating at least one leveling device mounted to the bottom of the particulate material supply compartment to distribute agricultural product about the bottom, and passing the agricultural product through the bottom of the particulate material supply compartment into a metering system. The method may also include the steps of collecting input from at least one sensor mounted to the metering system, and then rotating the at least one leveling device based on the input. More specifically, when the at least one coil is rotated, it may rotate in a first direction that pushes the agricultural product towards the sensor. Alternatively, the method may include collecting input from a first sensor mounted to a first section of the metering section and collecting input from a second sensor mounted to a second section of the metering section. In the event that the input indicates that agricultural material is not detected by the first sensor, the at least one coil may be rotated in a first direction to push agricultural product towards the first sensor. In the event that the input indicates that agricultural material is not detected by the second sensor, the at least one leveling device may rotate in a second direction opposite the first direction to push agricultural product towards the second sensor. Additionally, the method may include rotating a first leveling device located adjacent to a first side of the particulate material supply compartment in a first direction, and also rotating a second leveling device located adjacent to a second side of the particulate material supply compartment in a second direction opposite the first direction. Further still, the method may include rotating a third leveling device that is located between the first leveling device and the second leveling device.

In yet another aspect, an agricultural application implement may include a plurality of wheels supporting a frame that supports at least one particulate material supply compartment, a plurality of metering units, a first leveling device, a second leveling device, a third leveling device, and a plurality of sensors. The at least one particulate material supply compartment may have a first side, a second side, a front, a back, and a bottom and contains an agricultural product. The plurality of metering units is mounted adjacent to the bottom of the at least one particulate material supply compartment. Each of the leveling devices may have a driving shaft and a helical coil extending therefrom. The first leveling device may be mounted at the bottom of the at least one particulate material supply compartment at the first side. The second leveling device may be mounted at the bottom of the at least one particulate material supply compartment at the second side. The third leveling device may be mounted between the first leveling device and the second leveling device. The sensors may be mounted to the plurality of metering units in order to monitor the agricultural product that is moving from the at least one particulate material supply compartment to the metering units. Depending on the input from the sensors, one or more of the first leveling device, the second leveling device, and the third leveling device may be rotated. The leveling devices may extend along multiple axes, where a first axis and a second axis are not parallel to one another.

Other aspects, objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings.

While the invention is described herein in connection with certain preferred embodiments, there is no intent to limit it to those embodiments. On the contrary, the intent is to cover all alternatives, modifications and equivalents within the spirit and scope of the invention as defined by the appended claims.

DETAILED DESCRIPTION OF THE INVENTION

Figure 1:
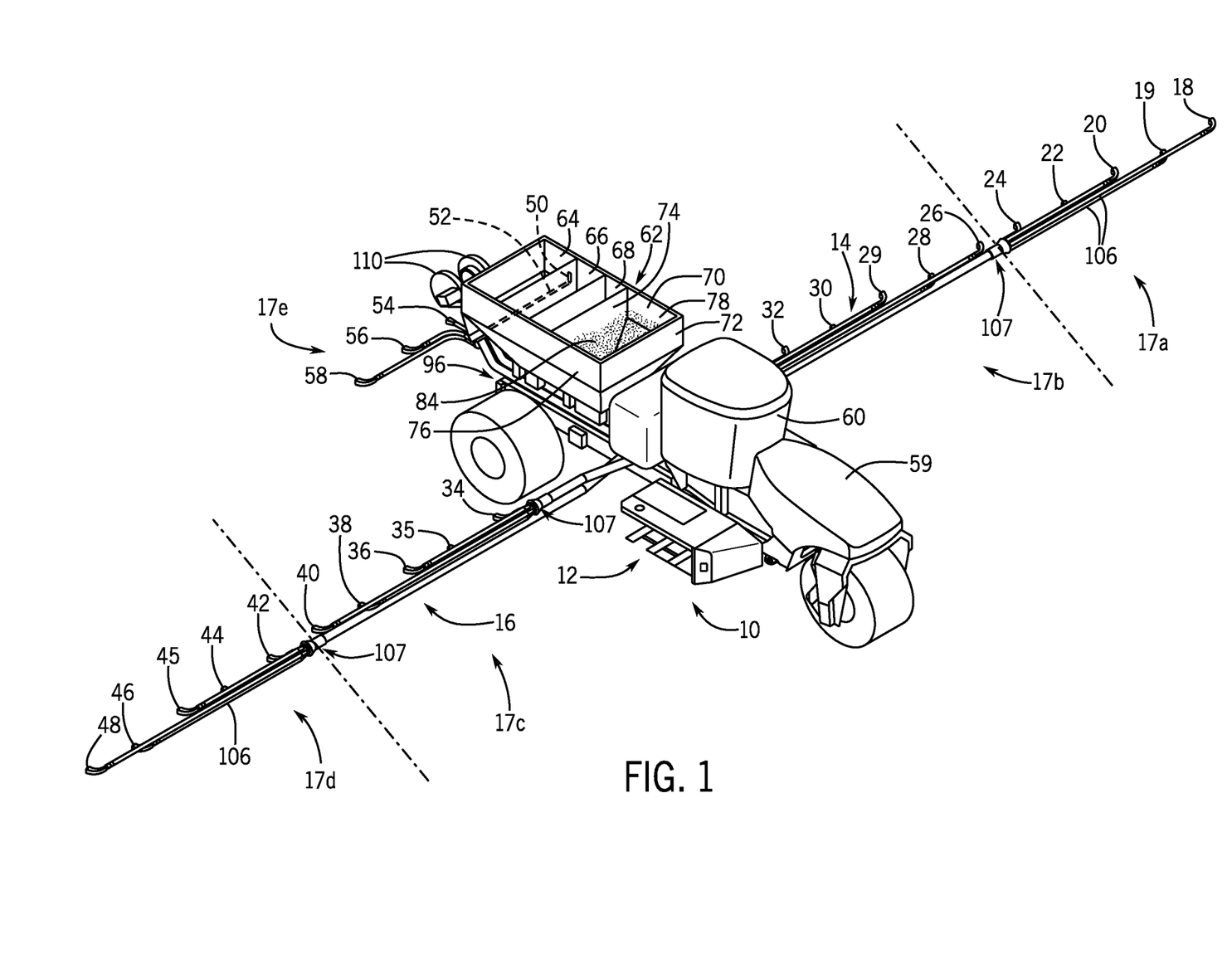
FIG. 1 illustrates an isometric view of an exemplary embodiment of an agricultural application implement, in the form of a dry granular applicator, comprising a product leveling system in accordance with an aspect of the present invention.
Figure 2:
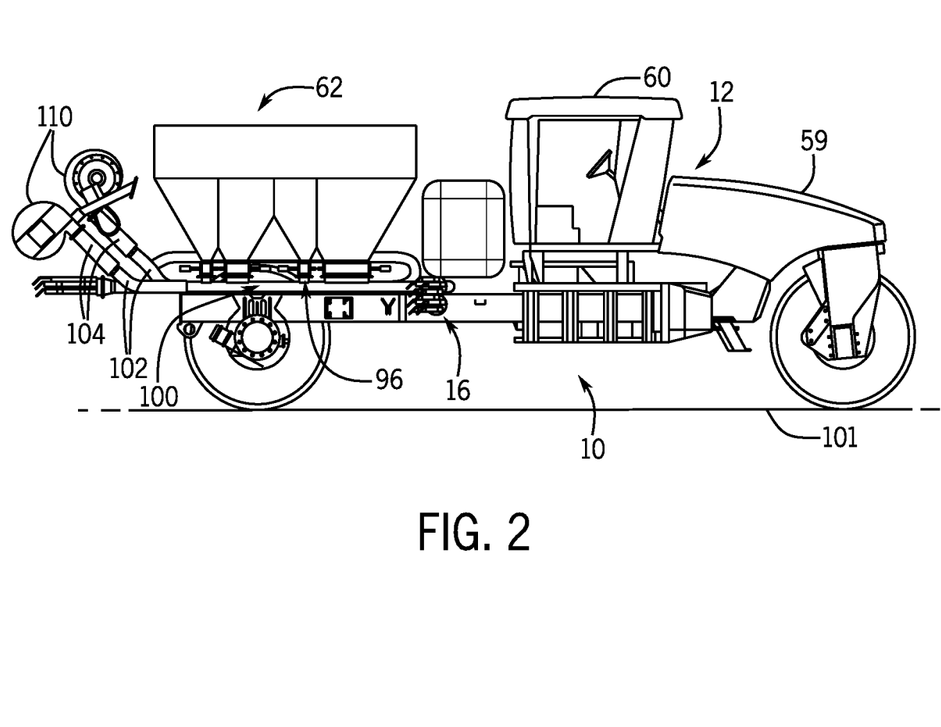
FIG. 2 illustrates a side elevation view of the applicator of FIG. 1.

Referring now to the drawings, and more particularly to FIGS. 1 and 2, an agricultural application implement 10 is shown, which could be a dry pneumatic granular applicator. As is known in the art, implement 10 generally includes a large wheeled transport unit 12 such as truck or tractor, and laterally extending particle delivery booms 14 and 16, which may be pivoted to a stowed position close to the implement for storage or transport. Each boom 14, 16 extends laterally from the implement 10 in opposite directions. Each boom 14, 16 includes a plurality of boom sections 17, such as left outer and left inner boom sections 17a, 17b of boom 14, and right inner and right outer boom sections 17c, 17d of boom 16. Each boom section 17 is defined by a large diameter supply line 102 for supplying the boom section with granular or particulate material, such as seed, fertilizer, herbicide, insecticide and the like. Each boom section 17 includes a plurality of boom tubes or conduits terminating at particle delivering units, which for the implement 10 are spreading outlets or nozzles. In the exemplary embodiment shown, left outer boom section 17a of boom 14 includes five nozzles 18, 19, 20, 22 and 24; left inner boom section 17b of boom 14 includes five nozzles 26, 28, 29, 30 and 32; right inner boom section 17c of boom 16 includes five nozzles 34, 35, 36, 38 and 40; and right outer boom section 17d of boom 16 includes five nozzles 42, 44, 45, 46 and 48. Additionally, at the back of implement 10 there is a centrally mounted rear boom section 17e also defined by a large diameter supply line 102 for supplying the boom section with granular material. At the rear boom section 17e are five rear nozzles 50, 52, 54, 56 and 58 to provide full and complete coverage across the width of implement 10, including the area between the inboard-most nozzles 32 and 34 of booms 14, 16. The rear boom section 17e allows spread of the particulate material/product over/onto the ground over which the implement 10 passes for complete coverage. Although five boom sections 17, with five nozzles per boom section, is shown by way of example, in other aspects greater or fewer boom sections 17, and/or greater or fewer nozzles per boom section 17, can be provided within the scope of the invention.

The transport unit 12 can be self-propelled by an engine in an engine compartment 59 and can include an operator cab 60 having a Human Machine Interface (HMI) available to the user. In the exemplary embodiment shown, an uncovered tank 62, open to the environment and ambient atmospheric conditions, includes compartments 66 and 70 for carrying particulate material to be distributed by a metering array 96 for ultimate disbursement by nozzles 18-58. Further smaller compartments 64 and 68 are provided to supply micro-nutrients or other materials to the metering array 96. The supply of particulate in compartments 64, 66, 68, 70 can be replenished periodically from a supply vehicle (not shown).

Figure 3:
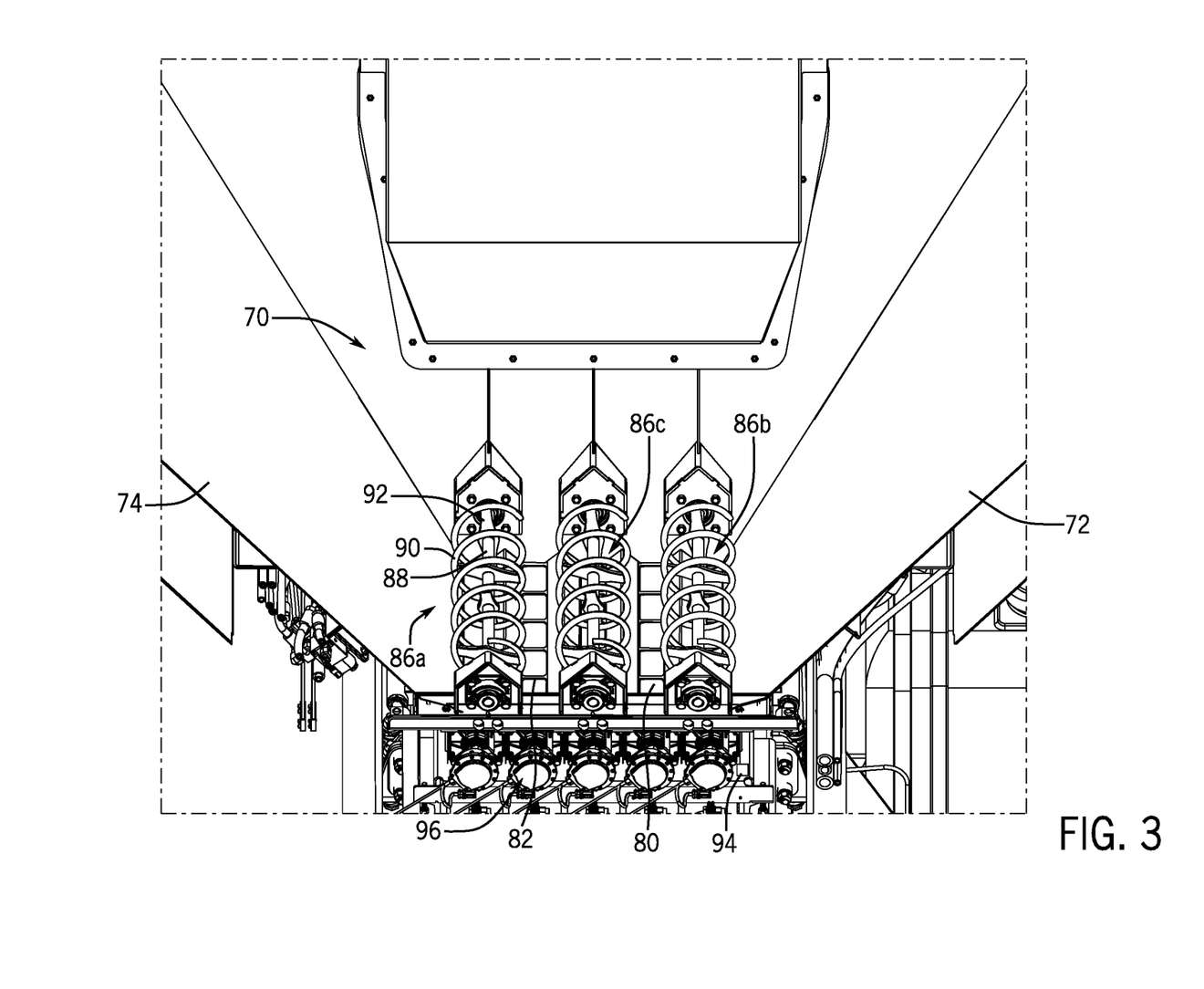
FIG. 3 illustrates an isometric view the product leveling system mounted within a compartment of the applicator of FIG. 1 in accordance with an aspect of the present invention.
Figure 4:
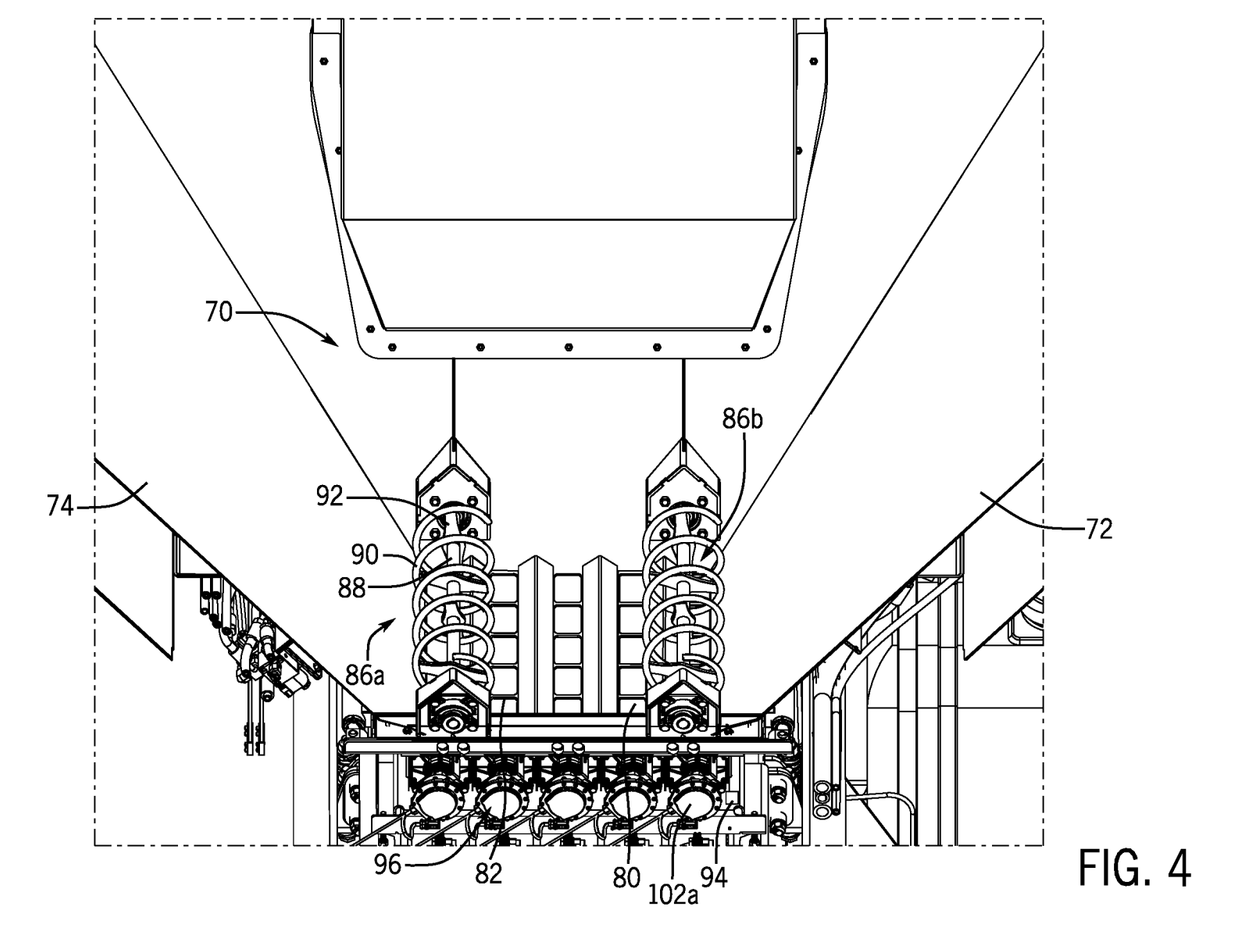
FIG. 4 illustrates an isometric view of another the product leveling system mounted within a compartment of the applicator of FIG. 1 in accordance with an aspect of the present invention.
Figure 5:
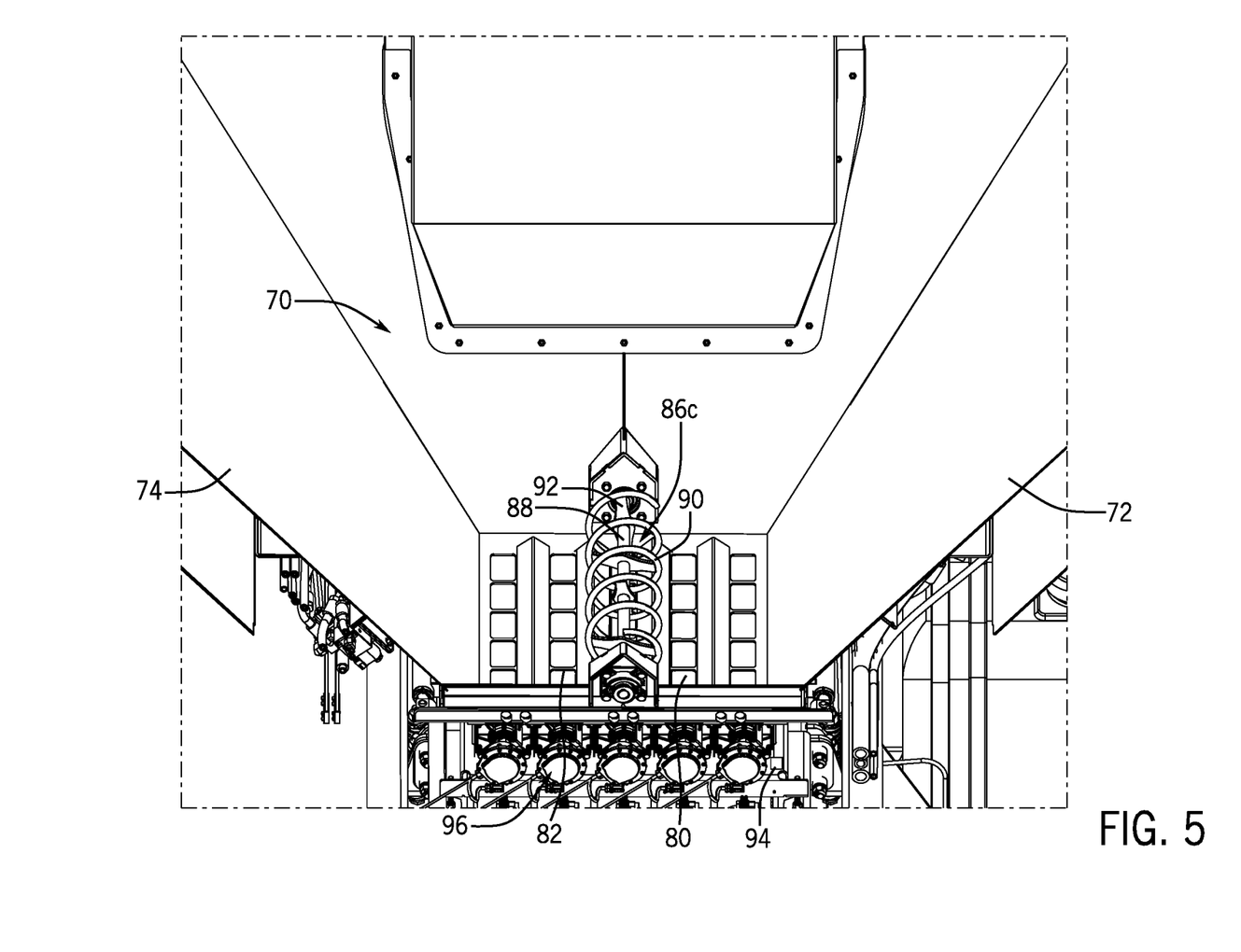
FIG. 5 illustrates an isometric view of another the product leveling system mounted within a compartment of the applicator of FIG. 1 in accordance with an aspect of the present invention.

FIGS. 3-5 show exemplary interior views of compartment 70. While only compartment 70 is shown, it should be appreciated that any of the other compartments 64, 66, 68 may have similar features. As shown, the compartment 70 is generally funnel shaped to encourage movement of particulate materials downwardly. More specifically, the compartment 70 has a first side 72 and a second side 74 that may be sloped in a downward, inward direction. The compartment 70 may also have a third side 76 and a fourth side 78, both of which may or may not be sloped like the first side 72 and the second side 74. Additionally, the compartment 70 has a bottom 80 with at least one bottom opening 82. Because the first side 72 and the second side 74 are sloped towards the bottom opening 82, this helps to encourage movement of the agricultural product 84 contained within the compartment 70 towards the opening 82.

Additionally, the compartment 70 may be equipped with components that help to ensure consistent movement of the agricultural product 84 out of the compartment 70 to maximize the emptying rate before the starving of the agricultural product 84 from a portion of the compartment 70. As shown, the compartment 70 may have at least one leveling device 86 mounted adjacent to the bottom opening 82 of the compartment 70. For instance, as seen in FIG. 5 the compartment 70 may be equipped with a single leveling device 86. Alternatively, as seen in FIG. 4, the compartment 70 may be equipped with two leveling devices 86a, 86b located at either side of the compartment. Further still, as seen in FIG. 3, the compartment 70 may be equipped with three leveling devices 86a, 86b, 86c.

Each of the leveling devices 86 may have a driving shaft 88 with a helical coil 90 extending therefrom by supports 92. More specifically, the driving shaft 88 is substantially cylindrical in shape for easy rotation, and supports 92 mounted at opposing ends of the driving shaft 88 extend outwardly therefrom. The helical coil 90 extends around the driving shaft 88 in intervals, shapes, and dimensions described more below. The driving shaft 88 may be rotatably mounted to the compartment 70 where the driving shaft 88 is driven in a clockwise or counterclockwise direction by a motor or motors (not shown) as known in the art.

Figure 7:
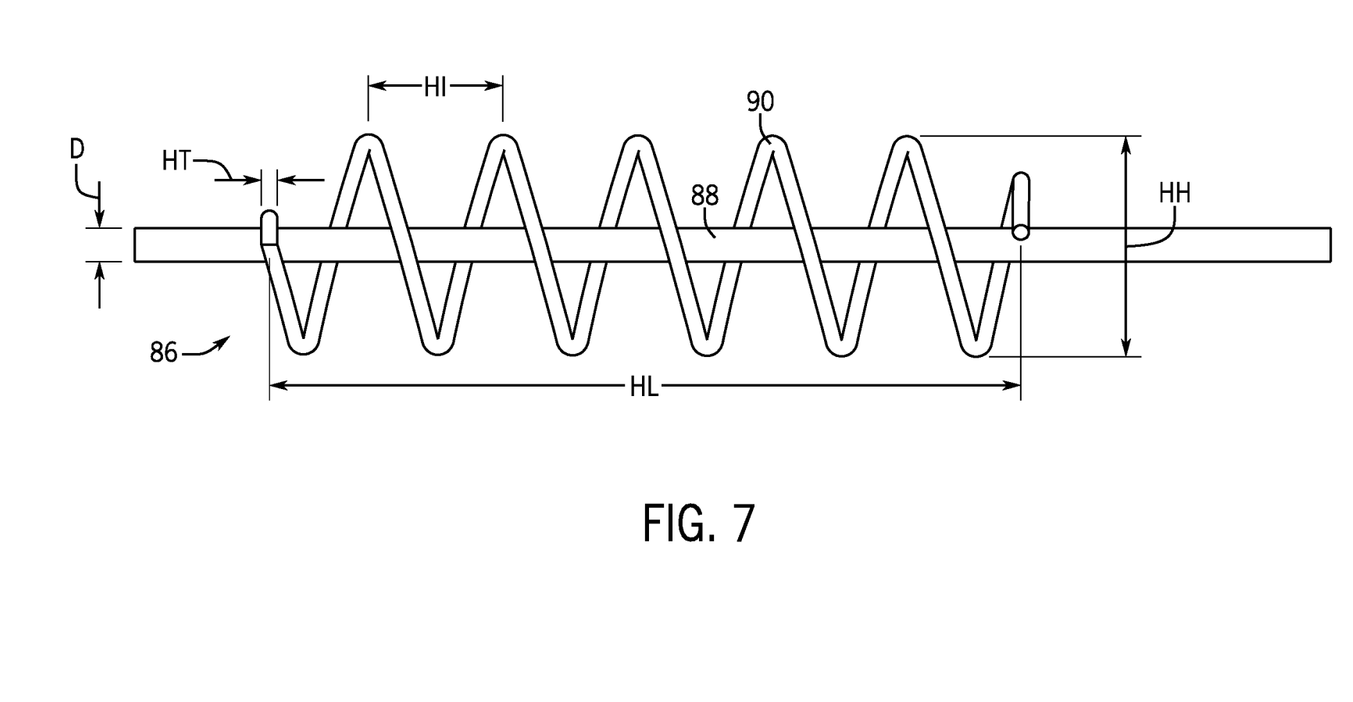
FIG. 7 illustrates a side elevation view of one of the leveling devices associated with the product leveling system, in accordance with an aspect of the present invention.

Turning now to FIG. 7, specific embodiments of the leveling device 86 will be described. The leveling device 86 has a helical length HL that extends along the length of the helical coil 90. The helical length HL of the leveling devices 86 may be long enough to extend across the entire length of the compartment 70. For instance, the helical length HL could be between 10-30 inches, and more preferably approximately 22 inches. Additionally, the system may have multiple segments of leveling devices 86 that are placed or connected back-to-back to result in longer total lengths rather than have a single leveling device 86 extending from side to side of the compartment 70. For instance, in some embodiments, the leveling device may have three different sections. In such an embodiment, the various sections may all be approximately 11.5 inches in length.

Additionally, the leveling device 86 has a helical height HH that represents the outer diameter of the helical coil 90. The helical height HH of the helical coil 90 may be between 2-10 inches. In some embodiments, the helical height HH of the helical coil 90 may be approximately 4 inches. In other embodiments, the helical height HH may be approximately 6 or 6% z inches to better span the bottom 80 of the compartment 70.

Further still, the leveling device 86 has a helical interval HI that is the distance between one interval of each helical coil 90. This helical interval HI length may also be referred to as the pitch of the helical coil 90. For instance, the helical interval HI may be between 1-9 inches. As shown, the helical coil 90 may have a helical interval HI pitch of approximately 4 inches. In other embodiments, the helical interval HI pitch is approximately 6 inches, which can result in the leveling device 86 having a wider footprint at the bottom 80 of the compartment 70.

Also, the leveling device 86 has a helical thickness HT that is the thickness of the helical coil 90. For instance, the helical thickness HT may be between ¼ and 3 inches. As shown, the helical thickness HT of the helical coil 90 may be between approximately ⅜ of an inch and ½ of an inch. A thicker helical thickness HT helps to maintain coil rigidity.

Figure 6:
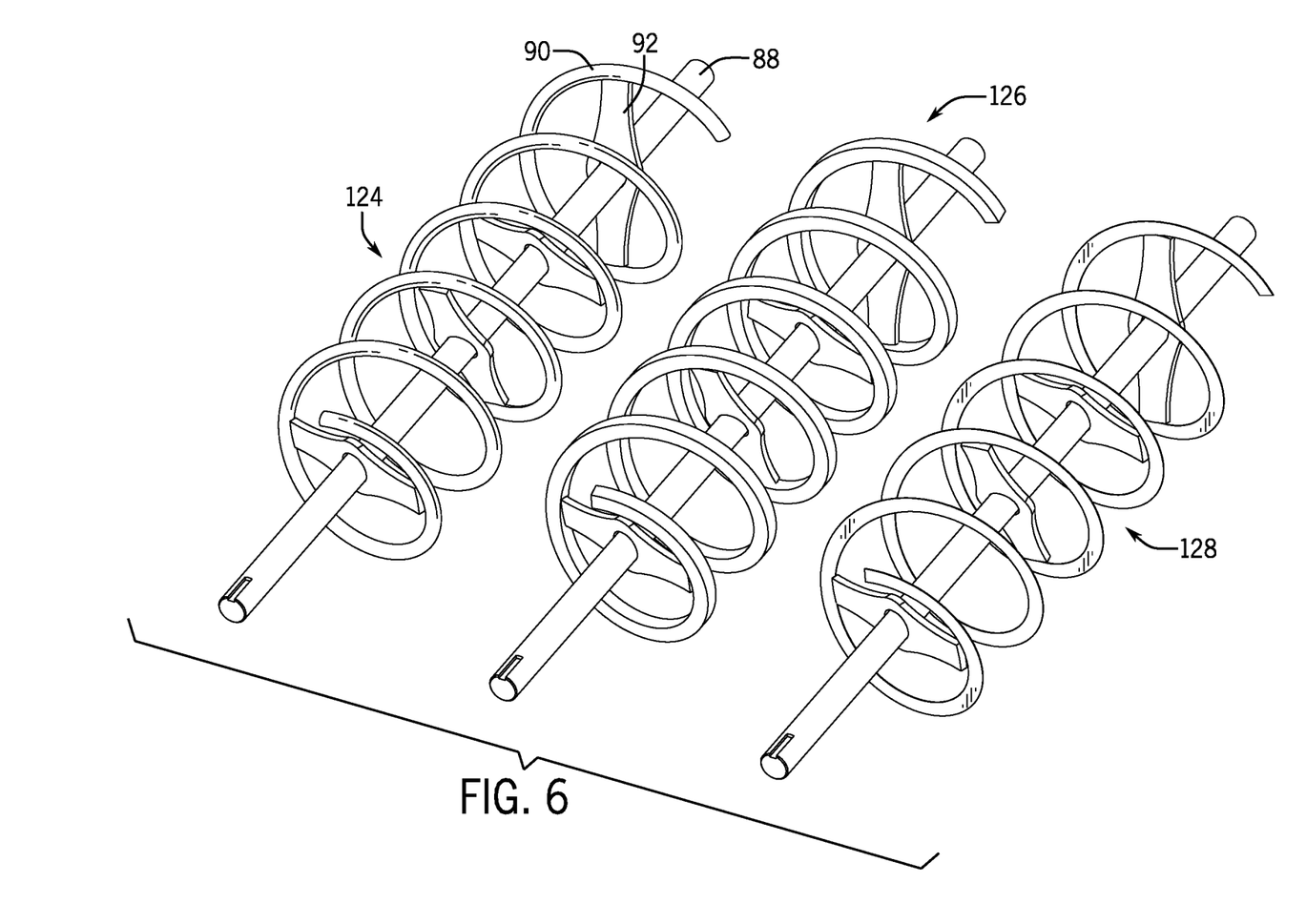
FIG. 6 illustrates an isometric view of a plurality of leveling devices associated with the product leveling system, in accordance with an aspect of the present invention.

In addition to having different helical thicknesses HT, the cross-sectional shape of the helical coil 90 may be varied, as shown in FIG. 6, to achieve differing characteristics. For instance, a round bar 124 may be used, a square bar 126 may be used, a flat bar 128 bar may be used, or a combination of different bars configurations may be used. The specific profile of the coil 90 can be selected depending on the desired characteristics thereof. In one instance, a round bar may be selected to reduce torque. Alternatively, a flat bar may be selected to increase leveling efficiency. Further still, a square bar may be selected to add strength. Alternatively, a combination of different bar profiles may be combined within a compartment to optimize movement of particles out of the compartment. Additionally, the helical coil 90 may be a right-handed coil or a left-handed coil.

Additionally the driving shaft 88 has a diameter D. For example, the driving shaft 88 diameter D may be between 0.25 inches and 3 inches, and more preferably approximately 1 inch. Alternatively, the driving shaft 88 may have a diameter D of approximately ⅝ of an inch.

Of course, the driving shaft 88 and the helical coil 90 may have larger or smaller diameters and different pitches and helical coil lengths depending on a number of factors, including the size and shape of the compartment 70, the agricultural product 84 that is being housed within the compartment 70, and any other factors. Additionally, the parameters may be selected in order to minimize torque where desired.

Further still, although the illustrated leveling devices 86 are all in the same horizontal plane, it should also be noted that some or all of the leveling devices 86 may be horizontally offset from one another (not shown). For instance, where three leveling devices are used, the first and second leveling devices may be located on the same horizontal plane on either side of the compartment, whereas the third leveling device is either in a higher or lower horizontal plane. Additionally, the illustrated leveling devices 86 all run substantially parallel with one another. That said, the leveling devices could also be non-parallel to one another (not shown). Further still, the leveling devices 86 may be oriented in different ways relative to a metering array 96 that will be further described below. More specifically, the leveling devices 86 may be oriented perpendicular relative to the metering array 96.

Additionally, at least one sensor may be used with the leveling device or leveling devices 86. While only one sensor 94 is shown schematically in the figures, it should be noted that additional sensors may be located around the metering array 96 of the compartment 70. More specifically, sensors 94 may be mounted about the metering array 96 beneath the compartment 70 to monitor when agricultural product 84 is depleted from a given section of the compartment 70. For instance, if a given sensor 94 determines that all of the agricultural product 84 has been removed from a section of the compartment 70, known as "starving" of that section of the compartment 70, the sensor 94 can enable rotation of at least one or more leveling devices 86 to encourage agricultural product 84 to be moved towards that section. This results in uniform or semi-uniform movement of the agricultural product 84 out of the compartment 70. Preferably, the sensor or sensors 94 will be strategically mounted in locations of the compartment 70 that are most prone to starving. When the sensor or sensors 94 detects that the section is starved of agricultural product 84, one or more of the leveling devices 86 located adjacent to the section can be rotated. More specifically, the driving shaft 88 of the leveling device 86 can be rotated, which in turn causes the helical coil 90 to rotate. For instance, the leveling device 86 may be rotated at a rate of between 10-30 rotations per minute, and more preferably approximately 20 rotations per minute for the disclosed embodiments. Of course, the rate of rotation could be varied depending on a number of factors, include the size and configuration of the leveling devices 86 and the compartment 70. The helical coil 90 is in contact with the agricultural product 84, such that as the coil 90 rotates, the agricultural product 84 is moved into the starved section. Depending on the location of the section that is being starved, the leveling device or leveling devices 86 may be rotated in a clockwise or counterclockwise direction. Further still, where multiple leveling devices 86 are located within the compartment 70, some of the leveling devices 86 may be rotated in a clockwise direction, while others are rotated in a counterclockwise direction to ensure the agricultural product 84 reaches the starved areas. Additionally, if a first rotation of the leveling device or devices 86 does not result in the movement of agricultural product 84 to a starved section of the compartment 70, the direction of rotations can be switched. In light of the rotation of the leveling devices 86, the emptying rate of the agricultural product from the compartment 70 is maximized while minimizing starving.

Figure 8:
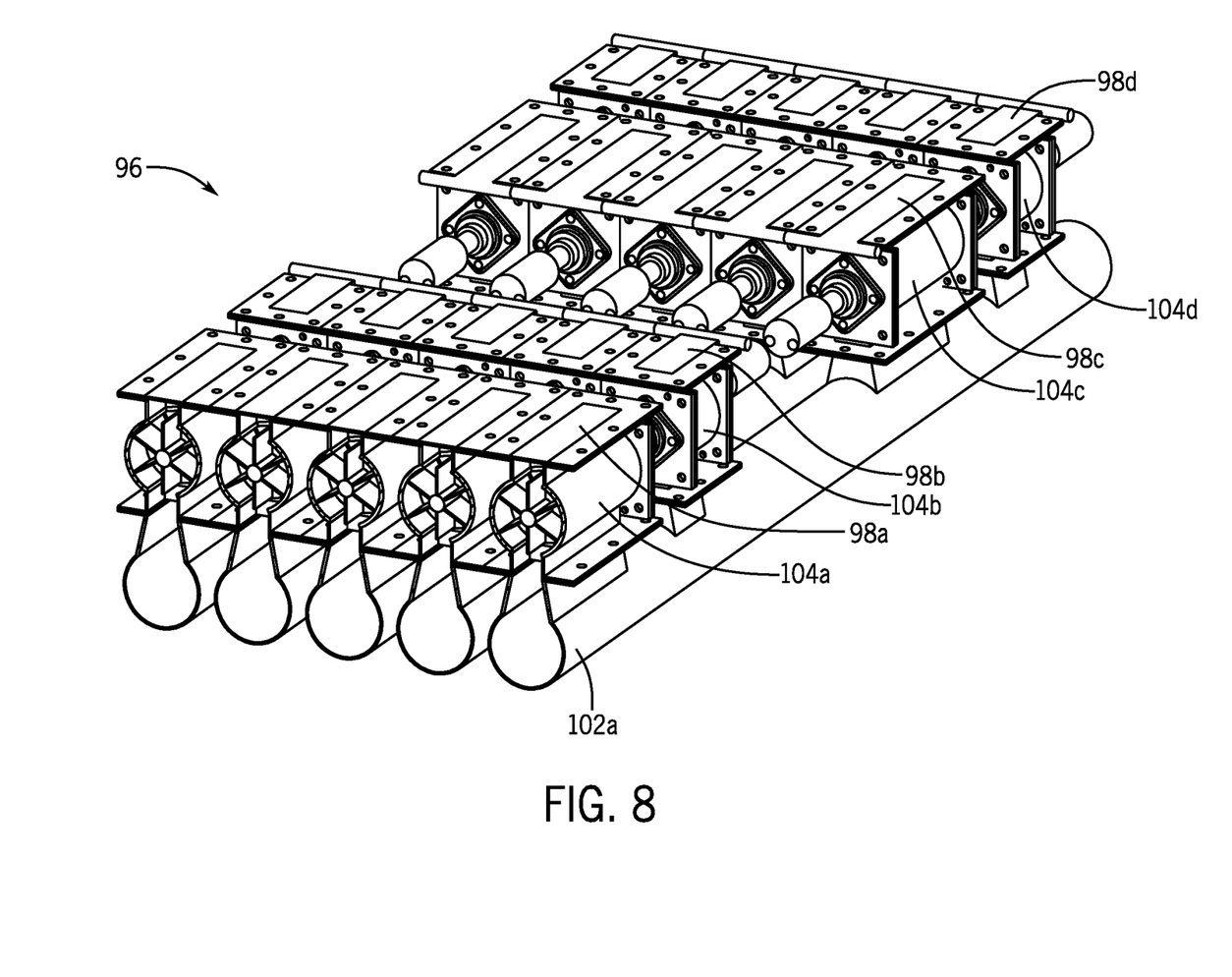
FIG. 8 illustrates an isometric view the metering system of the applicator of FIG. 1 located beneath the leveling devices in accordance with an aspect of the present invention.

With additional reference to FIG. 8, the metering array 96 is disposed below the compartments 64-70 of the tank 62 so that the meters can receive granular material from the various compartments when particular electronically, hydraulic, or pneumatic manual actuated gates 98 are selectively open to various positions. A conveying system 100, which could be a pneumatic conveying system or assembly, is disposed below the metering array 96 so that the agricultural product 84 can be distributed to the nozzles when metered by the metering array 96. The conveying system 100 includes multiple large diameter supply lines 102, which could be 5 inches in diameter, that extend from a plenum 104 at one end, under the compartments 64-70 and the metering array 96, and terminate at individual boom sections 17. At each boom section 17, the supply lines 102 and the agricultural material or product 84 transported therein are split by a suitable distribution structure or mechanism 107, such as a plurality of horizontal rotary distributors, among or into a number of secondary or smaller supply lines 106, which could be 2.5 inches in diameter, that are connected to individual nozzles 18-58.

As described above, the product leveling devices 86 can be rotated to further encourage the agricultural product 84 from the compartment 70 down into the metering array 96. Thereafter, to collect and drive the agricultural product 84 along the lines 102, one or more fans 110 can be operably connected to the plenum 104 opposite the inlet ends of lines 102 as described herein. The air flow from the fans 110 is directed through the plenum 104 and into the respective lines 102 as a result of the structure of the plenum 104. After the air flow passes through the plenum 104 and collects/entrains the agricultural product 84 from the compartments 64-70 with assistance via the metering array 96, the air flow continues to flow along each large diameter supply line 102, including with one or more 90° and/or 180° turns, to connect to the various boom sections 17. The fans 110 could be centrifugal fans.

Still looking to FIG. 8, the metering array 96 is comprised of multiple metering sections 104 disposed below gates 98. Again, the plurality of sensors 94 may be mounted about the metering array 96 or metering sections 104 to determine when agricultural product 84 is not being delivered to any of the sections 104. For any given supply line 102 leading to a section 17, a meter section 104 can be arranged for distributing granular agricultural product 84 from a compartment to the supply line when a corresponding gate 98 is open. For example, for a first supply 102*a*, a first meter section 104*a* can distribute granular agricultural product 84 from compartment 70 into the first supply line 102*a* when a first gate 98*a* is open; a second meter section 104*b* can distribute granular agricultural product 84 from compartment 68 into the first supply line 102*a* when a second gate 98*b* is open;

a third meter section 104c can distribute granular agricultural product 84 from compartment 66 into the first supply line 102a when a third gate 98c is open; and a fourth meter section 104d can distribute granular agricultural product 84 from compartment 64 into the first supply line 102a when a fourth gate 98d is open.

Figure 9:
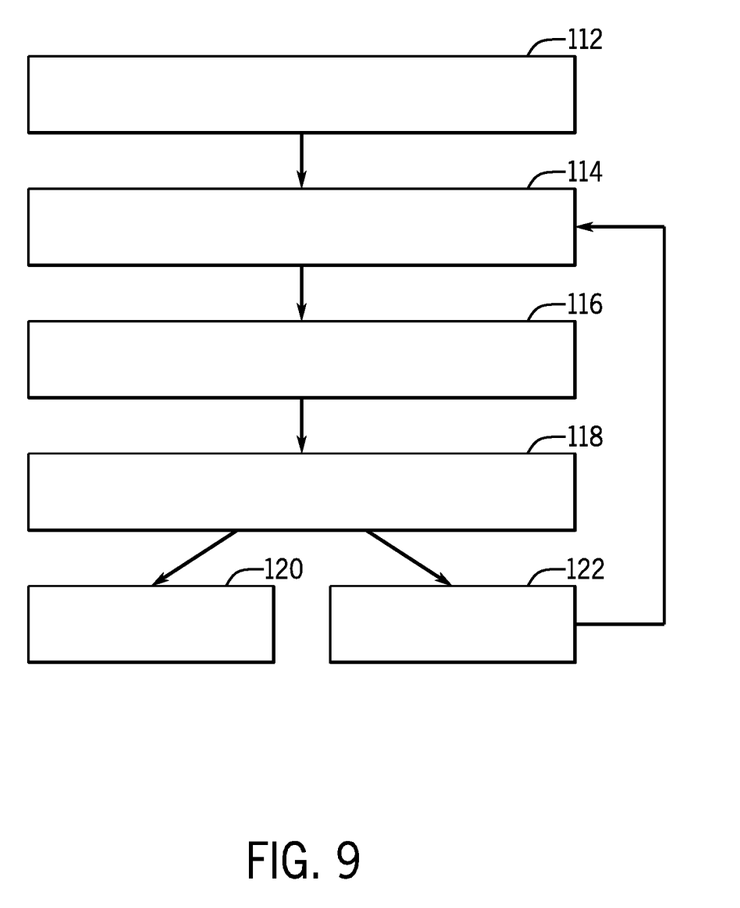
FIG. 9 illustrates a block diagram showing a method of leveling materials found within a tank or compartment.

The invention also relates to a method of leveling materials found within a tank or compartment as shown in a block diagram of FIG. 9. The various steps of the method will be provided below, although it should be noted that the steps may occur in any order, than not all of the steps are required in every embodiment, and that additional steps may be required in certain embodiments. The method includes the step of initially loading the agricultural product into the compartment having the bottom, as shown in block 112. Once the agricultural product has been loaded into the compartment, at least one leveling device mounted to the bottom of the compartment having a driving shaft and a helical coil can be rotated to distribute the agricultural product about the bottom, as shown in block 114. While the at least one leveling device is rotated, the agricultural product may be passed through the bottom of the compartment into a metering system, as shown in block 116. Additionally, input may be collected from at least one sensor that is mounted to the metering system, as shown in block 118. In the event that the sensor does not detect that product is being starved from any sections of the compartment, the products can continue to pass through the bottom, as seen in block 120. In the event that the sensor does detect that product is being starved from a section of the compartment, as seen in block 122, the sensor can cause the at least one leveling device to again be rotated. For instance, where there are two or more leveling devices, both may initially be rotated in the same direction. If rotation of the at least one leveling device in the first direction does not result in movement of the agricultural product to the starved section of the compartment, the at least one leveling device may be rotated in a second direction opposite the first. Where there are two or more leveling devices, some may be rotated in the first direction whereas others may rotate in the second direction. Additionally, multiple leveling devices may be provided where different leveling devices are rotated in different direction depending on the input from the sensor. Further still, multiple sensors may be provided, such that the different leveling devices may be rotated in the first or second direction depending on the input of the multiple sensors.

Although the best mode contemplated by the inventors of carrying out the present invention is disclosed above, practice of the above invention is not limited thereto. It will be manifest that various additions, modifications and rearrangements of the features of the present invention may be made without deviating from the spirit and the scope of the underlying inventive concept.

What is claimed is:

1. A product leveling system within a tank of an agricultural product delivery system, comprising:
 at least one particulate material supply compartment having a first side, a second side, and a bottom, the at least one particulate material supply compartment containing an agricultural product;
 a plurality of metering sections mounted adjacent to the bottom of the at least one particulate material supply compartment, the plurality of metering sections comprising a first metering section and a second metering section spaced apart from the first metering section;
 at least one leveling device rotatably located adjacent to the bottom of the at least one particulate material supply compartment;
 a first sensor provided in association with the first metering section to provide an indication of whether the agricultural product is being delivered from the at least one particulate material supply compartment to the first metering section; and
 a second sensor provided in association with the second metering section to provide an indication of whether the agricultural product is being delivered from the at least one particulate material supply compartment to the second metering section;
 wherein the at least one leveling device is rotated to distribute the agricultural product about the at least one particulate material supply compartment; and
 a direction of rotation of the at least one leveling device is selected based on the indication from the first and second sensors on whether the agricultural product is being delivered to the first and second metering sections.

2. The product leveling system of claim 1, wherein the at least one leveling device further comprises:
 a first leveling device mounted adjacent to the first side; and
 a second leveling device mounted adjacent to the second side.

3. The product leveling system of claim 2, wherein the first leveling device comprises a driving shaft and a right-handed helical coil extending therefrom; and
 wherein the second leveling device comprises a driving shaft and a left-handed helical coil extending therefrom.

4. The product leveling system of claim 2, wherein the at least one leveling device further comprises a third leveling device mounted between the first leveling device and the second leveling device.

5. The product leveling system of claim 1, wherein the at least one leveling device has a helical coil selected from a group consisting of a flat coil, a square coil, and a round coil.

6. The product leveling system of claim 1, wherein the at least one leveling device is configured to be rotated in a first direction when the first sensor indicates that the agricultural product is not being delivered to the first metering section such that the agricultural product is distributed towards a first section of the at least one particulate material supply compartment from which the first metering section is supplied the agricultural product and wherein the at least one leveling device is configured to be rotated in a second direction opposite the first direction when the second sensor indicates that the agricultural product is not being delivered to the second metering section such that the agricultural product is distributed towards a second section of the at least one particulate material supply compartment from which the second metering section is supplied the agricultural product.

7. A method of using an agricultural product delivery system, the agricultural product delivery system including a particulate material supply compartment containing an agricultural product, agricultural product delivery system further comprising a plurality of metering sections adjacent a bottom of the particulate material supply compartment, the plurality of metering sections including a first metering section and a second metering section spaced apart from the first metering section, the method comprising:
 receiving a first input from a first sensor provided in association with the first metering section, the first input providing an indication of whether the agricultural product is being delivered from the particulate material supply compartment to the first metering section;

receiving a second input from a second sensor provided in association with the second metering section, the second input providing an indication of whether the agricultural product is being delivered from the particulate material supply compartment to the second metering section;

selecting a direction of rotation for at least one leveling device located adjacent to the bottom of the particulate material supply compartment based on the first and second inputs received from the first and second sensors;

rotating the at least one leveling device in the selected direction of rotation to distribute the agricultural product about the particulate material supply compartment.

8. The method of claim 7, wherein the at least one leveling device comprises a first leveling device located adjacent to a first side of the particulate material supply compartment and a second leveling device located adjacent to a second side of the particulate material supply compartment.

9. The method of claim 8, wherein the at least one leveling device further comprises a third leveling device located between the first and second leveling devices.

10. The method of claim 7, wherein selecting the direction of rotation for the at least one leveling device comprises:

selecting a first rotational direction for the at least one leveling device when the first sensor indicates that the agricultural product is not being delivered to the first metering section such that the agricultural product is distributed towards a first section of the particulate material supply compartment from which the first metering section is supplied the agricultural product; and selecting a second rotational direction opposite the first rotational direction when the second sensor indicates that the agricultural product is not being delivered to the second metering section such that the agricultural product is distributed towards a second section of the particulate material supply compartment from which the second metering section is supplied the agricultural product.

11. An agricultural application implement comprising:
a plurality of wheels supporting a frame supporting:
at least one particulate material supply compartment having a first side, a second side, a front, a back, and a bottom and containing an agricultural product;

a plurality of metering sections mounted below the bottom of the at least one particulate material supply compartment, the plurality of metering sections comprising a first metering section and a second metering section spaced apart from the first metering section;

a first leveling device having a driving shaft and a helical coil rotatably mounted adjacent to the bottom of the at least one particulate material supply compartment at the first side;

a second leveling device having a driving shaft and a helical coil rotatably mounted adjacent to the bottom of the at least one particulate material supply compartment at the second side;

a first sensor provided in association with the first metering section to provide an indication of whether the agricultural product is being delivered from the at least one particulate material supply compartment to the first metering section; and a second sensor provided in association with the second metering section to provide an indication of whether the agricultural product is being delivered from the at least one particulate material supply compartment to the second metering section;

wherein a direction of rotation of at least one of the first leveling device or the second leveling is selected based on the indication from the first and second sensors on whether the agricultural product is being delivered to the first and second metering sections.

12. The agricultural application implement of claim 11, further comprising a third leveling device positioned between the first and second leveling devices.

13. The agricultural application implement of claim 11, wherein the at least one of the first leveling device or the second leveling device is configured to be rotated in a first direction when the first sensor indicates that the agricultural product is not being delivered to the first metering section such that the agricultural product is distributed towards a first section of the at least one particulate material supply compartment from which the first metering section is supplied the agricultural product and wherein the at least one of the first leveling device or the second leveling device is configured to be rotated in a second direction opposite the first direction when the second sensor indicates that the agricultural product is not being delivered to the second metering section such that the agricultural product is distributed towards a second section of the at least one particulate material supply compartment from which the second metering section is supplied the agricultural product.

* * * * *